Feb. 11, 1969 HIDEYA NISHIOKA 3,427,591

SYSTEM FOR COMPENSATING TIME DELAY OR SKEW BETWEEN EQUIDIGITALLY CORRELATED MULTITRACK SIGNALS

Filed March 18, 1966 Sheet 4 of 5

3,427,591
SYSTEM FOR COMPENSATING TIME DELAY OR SKEW BETWEEN EQUIDIGITALLY CORRELATED MULTITRACK SIGNALS

Hideya Nishioka, Kawasaki-shi, Japan, assignor to Fujitsu Limited, Kawasaki, Japan, a corporation of Japan Filed Mar. 18, 1966, Ser. No. 535,415
Claims priority, application Japan, Mar. 18, 1965, 40/15,993
U.S. Cl. 340—172.5 3 Claims
Int. Cl. G11b *13/00, 5/00*

My invention relates to a system for compensating time delay between equidigitally correlated signals from a number of conjointly operative signal tracks.

In a more specific aspect, the invention relates to a system of automatically compensating reader signals for time delay due to tape dynamic skew in magnetic tape equipment which functions to write and read digital signals on several tracks, all at the same time.

Generally, in this type of digital tape equipment, the signals of the same digit to be recorded on the magnetic tape are written at the same time on all of the tracks. Thus, a multi-bit signal is recorded with the equidigital bits spread in the direction of the tape width. For reading the signal, a read-out system is employed in which the signals of the same digit, written in the direction of the tape widths, are read simultaneously for all of the tracks.

During such writing and reading, the tape is fed at high speed, with repeated starting and stopping. Particularly in high-duty magnetic tape equipment for electronic computers, this speed is as high as 2 to 3 meters per second, so that it is difficult to maintain the normal running direction of the tape perpendicular to the gap of the read-write transducer head, making it impossible to avoid dynamic skew of the tape. As a rule, therefore, the signals of the same digit recorded on the tape are not accurately arranged perpendicularly to the edge of the tape, some positional deviation being inevitable.

Moreover, even if the writing has been accurately perpendicular to the edge of the tape for each digit, any skew occurring when running the tape while reading, causes some delay of read-out signals. Accordingly, actual operating conditions always involve skew effects during writing and reading, so that the time delay between tracks (hereinafter referred to simply as time delay) is not negligible compared with the signal separation from the adjoining same digit. Furthermore, such skew effects change with time, so that the amount of time delay varies irregularly, making its compensation difficult.

The method presently employed extensively in magnetic tape equipment, where current is used for magnetic recording of binary data, is the NRZ (non-return-to-zero) method, according to which the magnetic condition of the track is maintained at one of two fixed values ("0" or "1") over the entire clock cycle, namely from the start of one clock pulse to the start of the subsequent clock pulse, or over one bit section if referred to the length of the track. This is indicated by the signal "0" in the binary system, whereas the signal "1" indicates shifting of the magnetic condition to the other value for one cycle of the clock frequency.

In the NRZ recording system, any signal occurring within a certain fixed time delay is considered to be a signal of one and the same digit for detection, so that unless the amount of this time delay is sufficiently smaller than the time separation between the digits, the reading performance cannot always be accurate. It appears to be common practice to design tape feeding equipment for a maximum time delay of as little as ¼ of the time separation per digit. However, the present trend is toward higher processing speeds, so that it has become necessary to increase the number of digits recordable on a unit length of magnetic tape. Such increase in recording density is tantamount to reducing the time separation per digit for reading. To achieve this, the time delay must be further lessened in accordance with the writing density.

At present, however, the precision of the tape feed mechanism has been improved nearly to the limit, and it is considered infeasible to further reduce the time delay. Indeed, it may be said that the time delay due to dynamic skew now hampers the desired improvement of the recording density of magnetic tape equipment.

It is an object of my invention to nevertheless afford writing and reading at a far greater density than the known equipment of the above-mentioned type.

Another, more specific object of the invention is to provide means of automatically compensating for the time delay due to dynamic skew in the NRZ system at the reading side for the same digit.

A conjoint object also is to perform writing and reading of high density using the presently existing tape feeding equipment, thus remarkably improving the functions of such magnetic tape equipment.

Still another object of the invention is to provide a signal detection system of high recording density exceeding 1,000 bits per inch.

The invention will be described with reference to the accompanying drawings in which.

Figure 1:
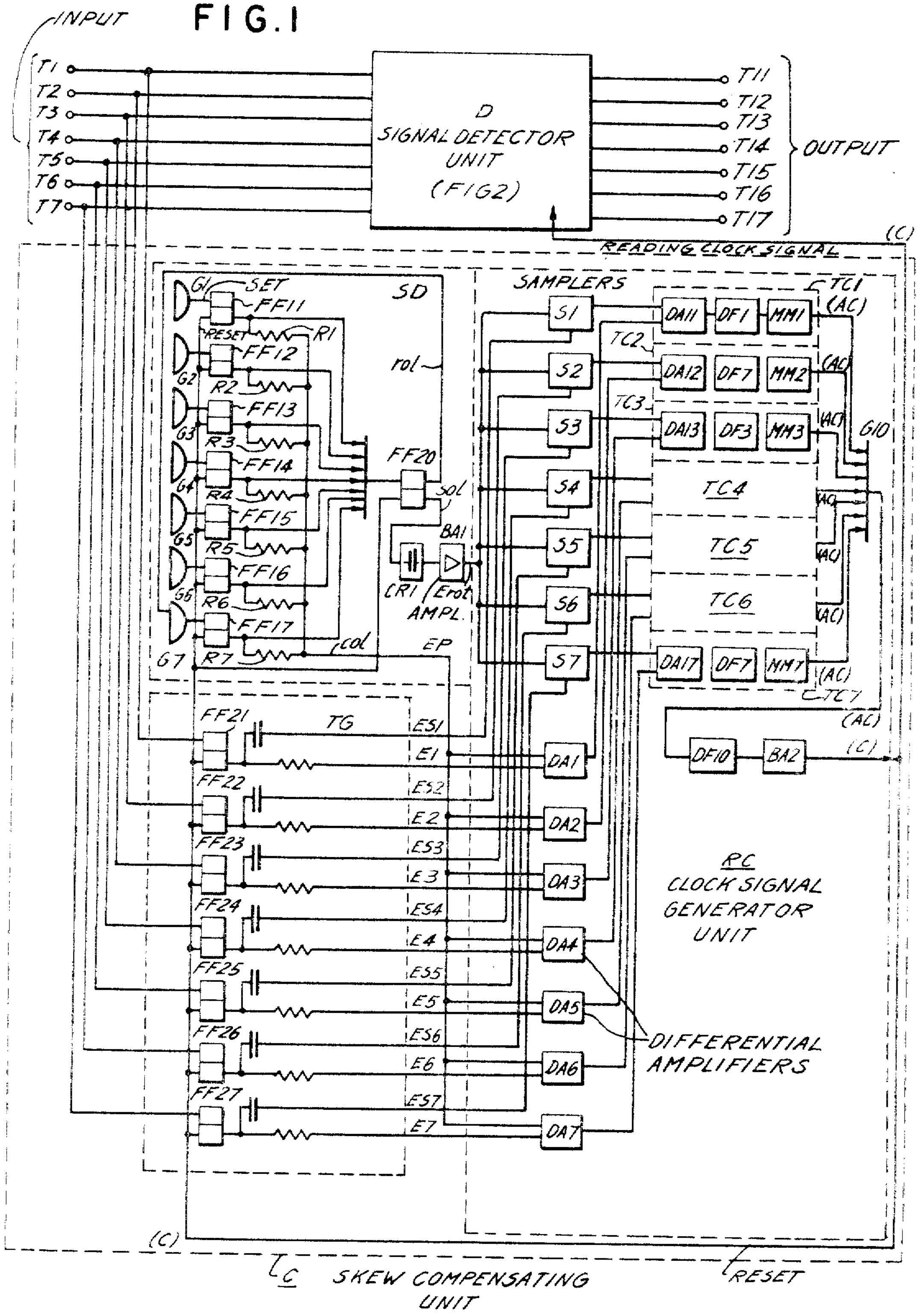
FIG. 1 is a schematic diagram of a skew compensating system according to the invention.
Figure 2:
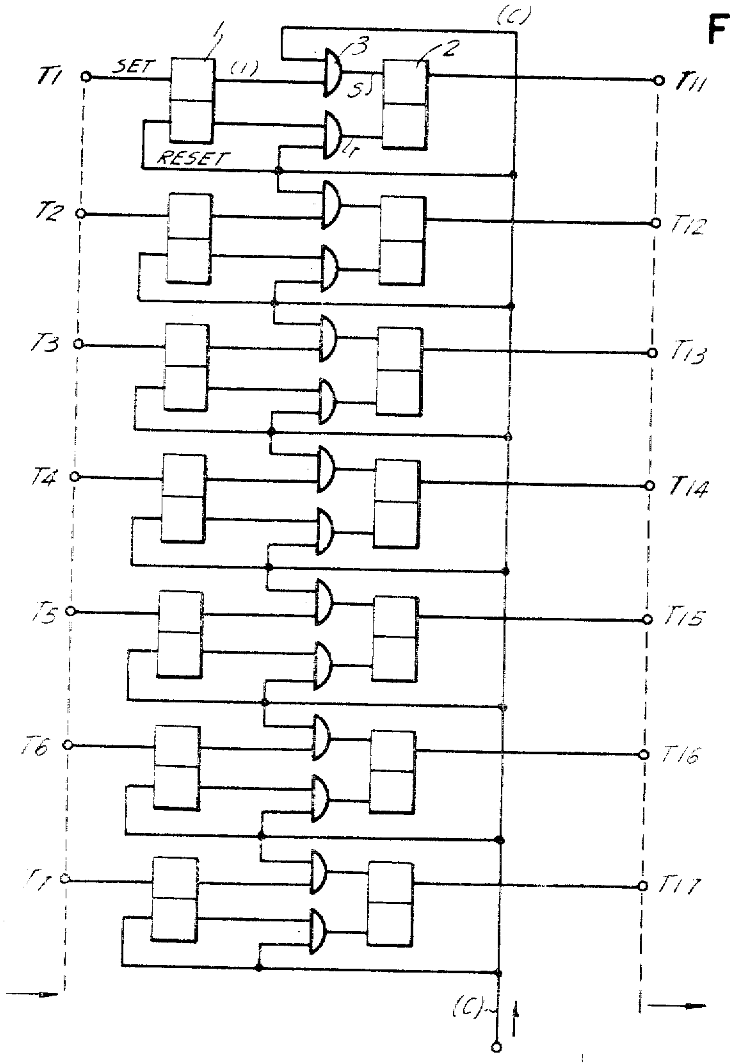
FIG. 2 shows the internal logic circuitry of a signal detector unit which forms part of the system represented in FIG. 1.
Figure 3C:
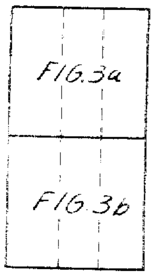
Figure 3A:
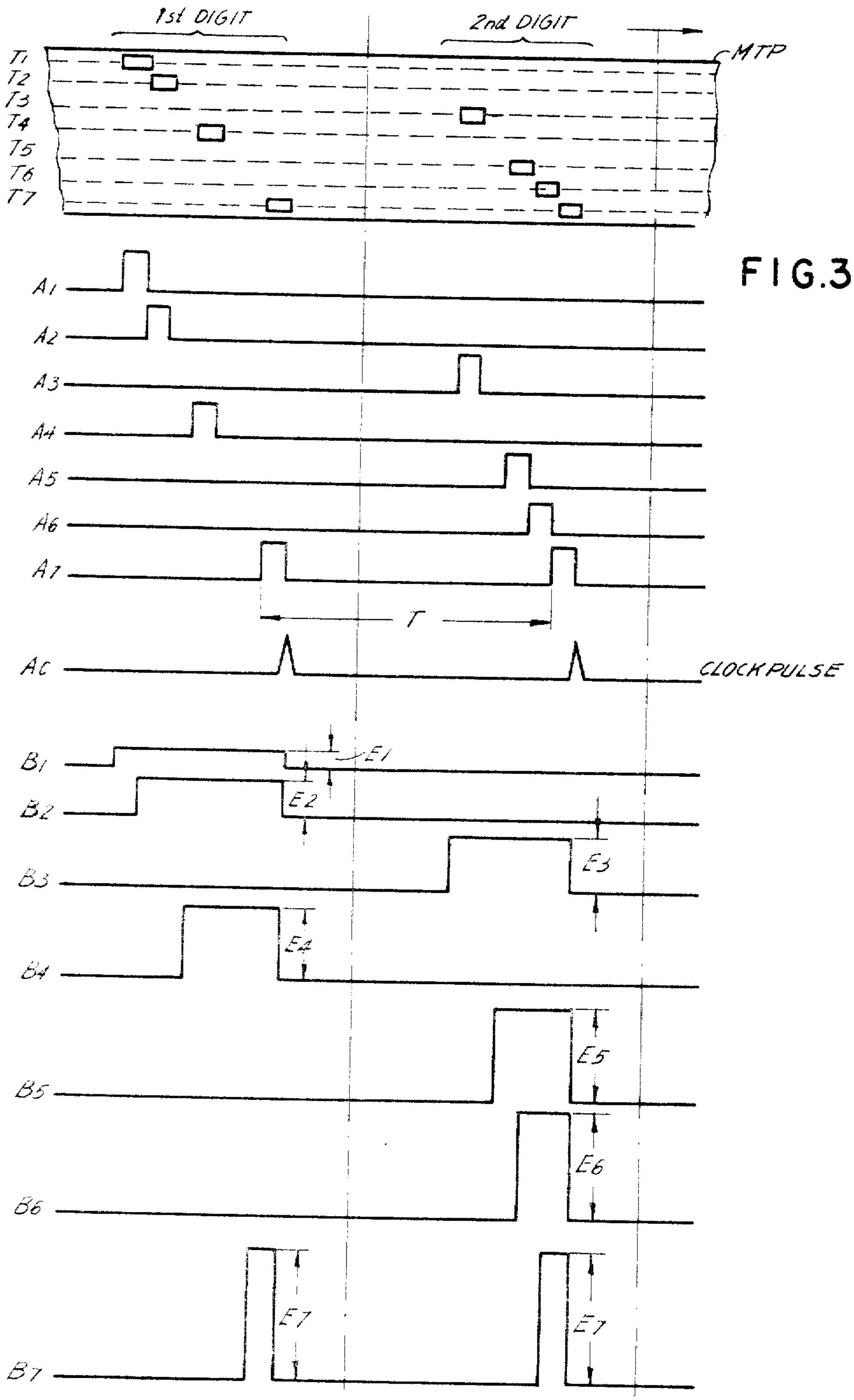
Figure 3B:
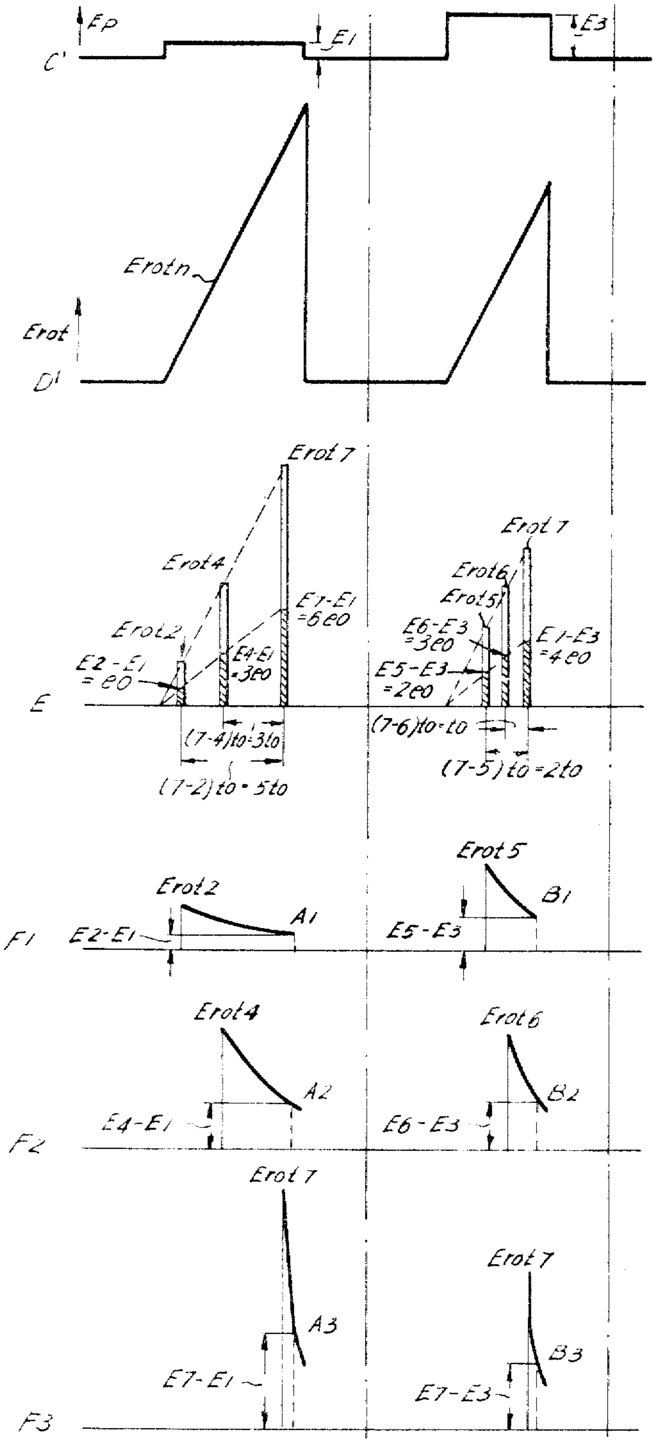

FIG. 3*a* and FIG. 3*b* show interrelated time-wave diagrams for each stage of operation in the system of FIGS. 1 and 2, and FIG. 3*c* shows how FIGS. 3*a* and 3*b* are preferably arranged one above the other.

Figure 4:
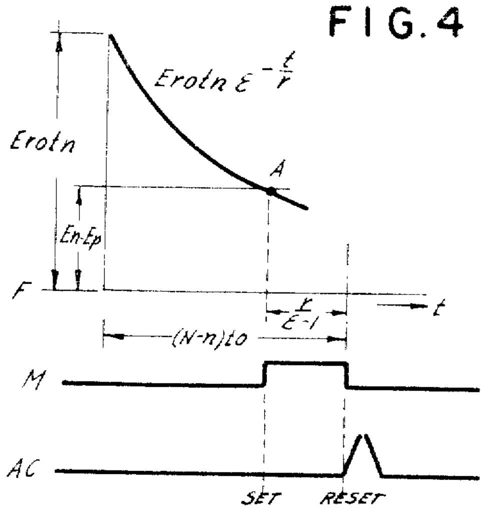
Figure 5:
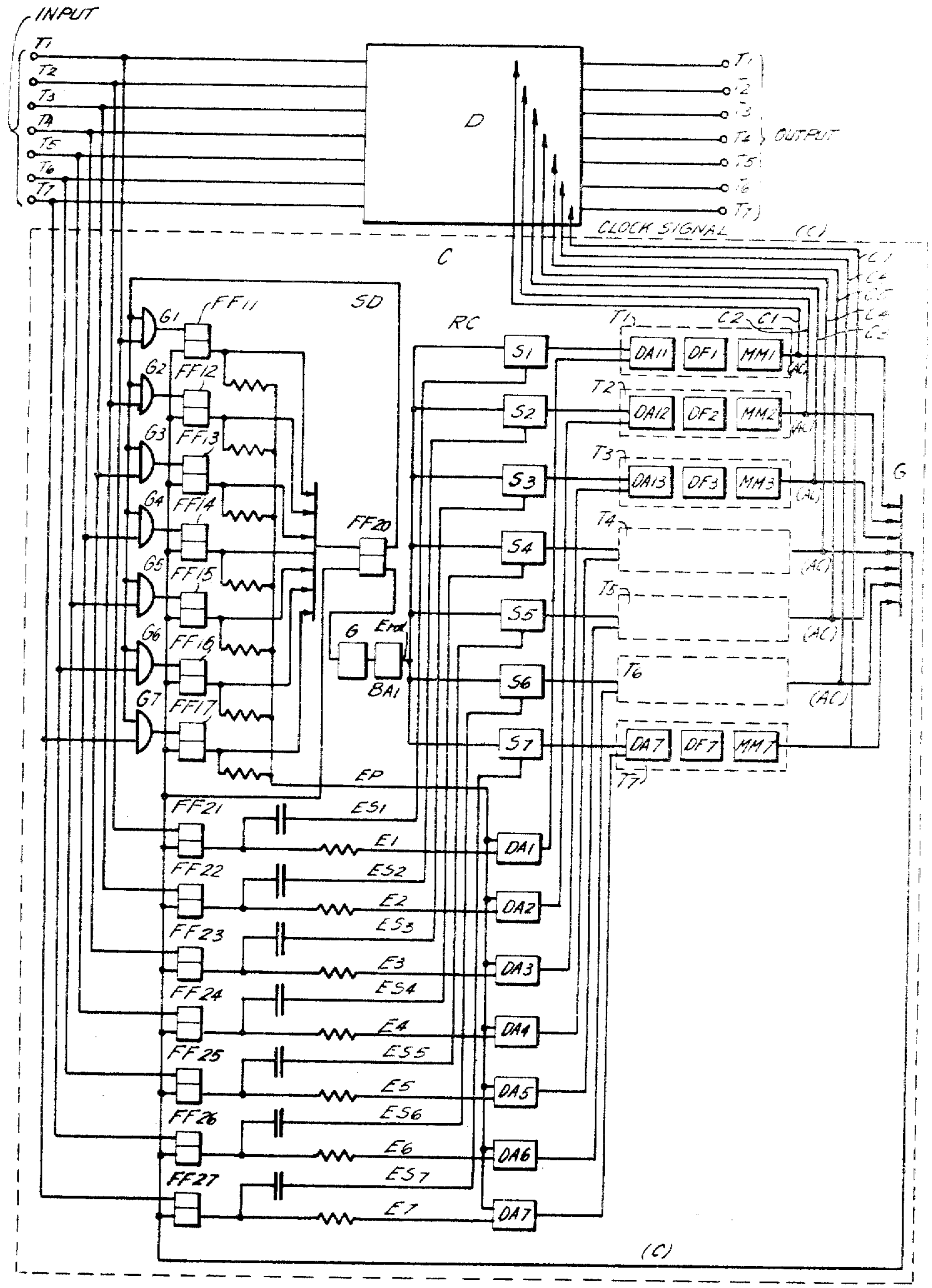

FIG. 4 is an explanatory diagram relating to the operation of the same system; and FIG. 5 is a schematic diagram of another embodiment of a skew compensating system according to the invention.

For readily understanding the invention, it will be helpful to first refer to FIG. 3*a* showing at the top a schematic representation of a magnetic tape MTP with seven tracks $T_1$ to $T_7$. Indicated on some of these tracks are magnetically recorded signals for two digits. As will be more fully explained, these track signals are shown in FIG. 3*a* in the proper time relation to electrical voltage pulses as they appear in the systems to be described. Primarily, the magnetically recorded signals are read off the tape by means of a reader head which furnishes respective reading signals at seven input terminals T1 to T7 shown in FIG. 1.

From the input terminals T1 to T7 the electrical signals pass through a signal detector unit D and appear modified to the proper pulse-wave shape and time position at respective output terminals T11 to T17. More specifically, the signals from input terminals T1 to T7 are amplified and rectified in the signal detector unit D and converted into a binary signal of square wave shape synchronized with a reading-clock signal.

The system further comprises a skew compensating unit C which cooperates with the above-mentioned signal detection unit D. In the skew compensating unit C, the time delay of the input signal is detected for each track and a time positioning control is performed with the aid of the reading clock signal.

The two main subsystems C and D will be more fully described presently.

The signal detector unit D comprises for each of the seven tracks a group of two flip-flops 1 and 2, consisting of bistable multivibrators, and two AND-gates 3 and 4 (FIG. 2). Since this group of components is the same for each of the seven tracks, only the one for the first track will be described in detail. The flip-flop 1 has its set input connected to the input terminal T1 and consequently is set by the input signal from track $T_1$ supplied from the reader. The reset input of flip-flop 1 is connected to a common clock signal lead which supplies a clock signal (C) from the skew compensating unit C. The flip-flop 2 is set from the set output of flip-flop 1 through the AND-gate 3 at coincidence with the clock signal (C). The flip-flop 2 is reset through the AND-gate 4 from the reset output of flip-flop 1 under coincidence control by the clock signal (C). The output of flip-flop 2 is connected to the output terminal T11.

As exemplified and purposely exaggerated in the representation of the magnetic tape MTP in FIG. 3*a*, the signals of the respective tracks may differ considerably in time delay due to dynamic skew or other factors. Also, since the clock signal for the reading operation is commonly supplied through OR-gates, there usually occurs a further delay from the coincidence moment of the OR-gate for the signal of each track. Consequently, a longer total delay may occur than corresponds to the most delayed track signal of the same digit.

To effect an accurate setting and resetting of the flip-flop circuits in the detection unit D, the clock signal, if operating with a fixed constant delay, must have a larger time delay than corresponds to the maximum possible time delay, but the clock signal delay must not be smaller than ½ of one cycle of the reading signal, this being the time separation between directly successive signals. The reason for this requirement is the fact that, when a digit having a signal only on the most delayed track is followed by a digit having a signal on the least delayed track, the reading clock signal for the first digit should be in advance of the clock signal for the subsequent digit. Generally, a time delay due to factors other than dynamic skew can be pre-compensated, so that the time delay due to dynamic skew can be maintained below $T/2$. Actually, this value should be kept approximately from $T/3$ to $T/4$ to allow for deviation of the compensated value and tape compatibility.

Now, according to the present invention, the clock signal is not kept at a fixed time delay but is time-shifted in accordance with the time delay of the reading signals, thus permitting the clock signal to automatically come into position with a slight delay compared to the most delayed signal on the track, which actually is the track positioned at the outermost edge of the tape. This time-shifting function is performed by the skew compensating unit C (FIG. 1). As a result, when the time delay is great, the clock signal for one digit is prevented from overlapping the signal for the following digit, and a maximum time delay up to a value approximately equal to the cycle period T becomes permissible, so that writing and reading can be performed at a density approximately twice as high as in the conventional reading systems.

In the system illustrated in FIG. 1, the skew compensating unit C performs the just-mentioned operation by the conjoint actions of a reference voltage generating unit SD for detecting skew, a track discriminating voltage generating unit TC, and a reading-clock signal generating unit RC.

In the reference voltage generating unit SD, the signal input terminals T1–T7 are connected through respective AND-gates G1–G7 to respective detector flip-flops FF11–FF17. Each of gates G1–G7 has another input connected through a common lead *ro*1 to a lock-out flip-flop FF20 to receive therefrom a voltage only when the flip-flop FF20 is in the reset state. Hence, when the most time-advanced input signal from any one of input terminals T1 to T7 appears, it passes through the one corresponding AND-gate G1 to G7 and flip-flop FF11 to FF17 to the set input of the flip-flop FF20, thus taking the gate-opening voltage off the reset output lead *ro*1 and closing all other gates of the group G1–G7 to prevent any further signal from the other input terminals T1–T7 to reach any of the flip-flops FF1–FF7. By virtue of this lock-out circuit, therefore, only the detector flip-flop connected to the track with the most advanced signal is set. For example, if the leading signal comes from track $T_1$, only the flip-flop FF11 is set; or if the most advanced signal comes from track $T_2$, $T_3$ or $T_4$, only the one corresponding detector flip-flop FF12, FF13 or FF14 will be set, and so forth.

The detector flip-flops FF11 to FF17 have respective outputs at which the signal voltage $E_p$ corresponding to the number of the track with the most advanced signal is available when the proper one flip-flop is set in the above-described manner. The voltage $E_p$ is applied through a common output lead *co*1 to the clock signal generator unit RC.

As exemplified in FIG. 1, the proper amplitude voltage $E_p$ is obtained by connecting a voltage divider circuit of resistors R1 to R7, having respective track values, to the output of the respective flip-flops FF11 to FF17. The $E_p$ voltage waveform is shown at C in FIG. 3*b*. The functioning of resistors R1–R7 in furnishing this $E_p$ voltage will be described in a later place.

The skew reference voltage generating circuit SD further comprises a capacitor charging circuit CR1 of a certain time constant which is connected to the set output lead *so*1 of the flip-flop FF20 to function only when the lock-out flip-flop circuit FF20 is set. A buffer amplifier BA1 amplifies the voltage from CR1 and functions to generate a voltage E*rot* proportional to time after the setting moment of the flip-flop FF20. The charging circuit CR1 is so constructed that, when the flip-flop FF20 is reset, the charged capacitor rapidly discharges at a time constant far smaller than that of the charging operation. The time curve of the resulting voltage E*rot* is shown at D in FIG. 3*b*.

The signals from input terminals T1–T7 are also applied to respective flip-flop circuits FF21 to FF27 in the track discriminating voltage generator unit TG. As a result, the respective flip-flops are set and generate the proper output signal voltage $E_n$, corresponding to the respective track numbers. The $E_n$ voltage wave for the seven tracks may correspond, for example, to those shown in FIG. 3*a* at B1, B2, B3, B4, B5, B6 and B7 respectively.

The clock signal generator unit RC differentiates the output waveform at the time of setting and thus produces a fixed amplitude pulse voltage E*sn* (*n* denoting the track number) for the purpose of sampling. The unit RC comprises sampling circuits S1 to S7 for the respective seven tracks, which serve to sample the skew detection reference voltages. Also provided in unit RC are differential amplifiers DA1 to DA7 which extract the voltage difference between the voltage $E_p$ indicative of the most advanced input signal and the $E_n$ voltage having the amplitude of the proper track. The outputs of the samplers S1–S7 and amplifiers DA1–DA7 are connected to timing circuits T1 to T7 which determine the timing for the clock signal generation by comparison of the respective output voltages from S1 to S7 with those from DA1 to DA7.

Each of the sampling circuits S1 to S7 comprises the usual gate circuit and a charging-discharging circuit composed of a diode, a capacitor and a resistor connected to the output of the gate circuit. Details of such sampling circuits are illustrated and described, for example, in my copending application Ser. No. 533,981, filed Mar. 14, 1966 (based upon a Japanese priority of Mar. 18, 1965), for Method and System for Recognizing Legible Characters. The voltages E*rot* and E*sn* are applied to the gate inputs, charging the capacitor of the sampling circuit to the value of the voltage E*rot* upon sampling; thereafter the discharging is performed in accordance with the given time constant, thus forming a waveform as shown in FIG. 4. The resulting voltages for tracks $T_1$, $T_2$ and $T_3$ are exemplified at F1, F2 and F3 respectively in FIG. 3*b*.

The differential amplifiers DA1 to DA7 are conventional. The two inputs of each amplifier receive the respective voltages $E_p$ and $E_n$ which are generated from one of the flip-flops FF11 to FF17 and one of the flip-flops FF21 to FF27. The amplified voltage difference appears at the amplifier output.

The timing circuits TC1 to TC7 function to compare the output voltages of the sampling circuits S1–S7, with the output voltages of the differential amplifiers AD1 to AD7, generating a pulse at the point where the two voltages become equal, namely at the time point A in FIG. 4, or at the time points A1, A2, A3, B1, B2 and B3 shown in the graphs F1, F2 and F3 of FIG. 3*b*. This pulse sets a monostable multivibrator MM1–MM7 (FIG. 1) which issues a timed pulse M as shown in FIG. 4. The resulting reset output is extracted in the form of a peaked pulse AC (FIG. 4). Each timing circuit TC1–TC7 (FIG. 1) accordingly comprises conventional differential amplifiers DA11 to DA17 which operate with the output voltages from the sampling circuits S1 to S7 and from the differential amplifiers DA1 to DA7. A conventional differentiating member DF1 to DF7 in each timing circuit functions to differentiate the output and generate the pulse at time point A of FIG. 4, and the monostable multivibrator MM1 to MM7 is set by the output pulse of this differentiating member to furnish the square-wave pulse M (FIG. 4).

In the present embodiment, the operating time of each multivibrator MM1 to MM7 is selected as $$\text{“}\frac{1}{\epsilon-1}\text{”}$$

of the time constant T of the respective sampling circuit. The time constant T is selected so that the reset output pulse AC (FIG. 4) of the monostable multivibrator MM*n* is generated at the time proportional to the ratio between the voltage E*rotn* (sampled by the reading signal per track; $n$=track number) and the voltage $E_n-E_p$ of the proper track. The reset pulse AC may appear at a time delayed from the sampling time point to by as much as to $(N-n)$ (FIG. 4).

The outputs of the monostable multivibrators MM1–MM7 are connected to a sum gate circuit G10 whose output is differentiated and amplified by means of a conventional differentiating circuit DF10 (FIG. 1) and a buffer amplifier BA2. The amplified pulse generated when the monostable multivibrators MM1–MM7 are all reset is used as the clock signal (C).

The flip-flop circuits FF11 to FF17, FF20, and FF21 to FF27 are reset by this clock signal (C).

As will be understood from the above explanations, the resetting output of any of the monostable multivibrators MM1 to MM7 is generated at the same time as the reading signal of the track located at the outermost edge where the time delay is greatest. Since theoretically this resetting output is used for providing the reading clock signal for all of the tracks, the purpose of compensating for skew is theoretically achieved. However, an irregular time delay, however slight, may occur in each track, due to factors other than dynamic skew. For this reason, the output of the monostable multivibrators MM1 to MM7 does not necessarily secure full precision. This is mainly attributable to the read-write head, magnetic tape, and frequency response of the electrical circuitry. The effect of the advancing code also may cause some time delay. A regular time delay may be due also to adjustment error of the mechanism used for compensating the positional deviation of the head gap.

With these factors in mind, the system shown in FIG. 1 is a so designed that the reading clock signal is generated at the moment when the logical sum of the resetting output from the monostable multivibrators MM1–MM7 in the timing circuits TC1–TC7 coincides with the most delayed resetting output from any one of the monostable multivibrators MM1–MM7.

However, in cases where there is hardly any irregular time delay due to factors other than dynamic skew, the resetting output of each monostable multivibrator MM1 to MM7 may be used more directly as clock signal for each track, instead of using the most delayed resetting output of the monostable multivibrators MM1 to MM7 as common clock signal for all of the tracks. In this system, shown in FIG. 5, the output signal of the monostable multivibrators MM1 to MM7 is applied as it is to the clock circuit for each track of the signal detection circuit D. Although not shown in FIG. 5, a differentiating circuit and buffer amplifier may be inserted into each of the clock circuit leads C1 to C7.

When there exists an irregular time delay due to factors other than dynamic skew, and even in the case of a non-uniform time relation of the output of the monostable multivibrators MM1 to MM7, the system shown in FIG. 5 may also be used in combination with a conventional clock system.

While in the foregoing explanations the signal from track $T_1$ is assumed to be most advanced and that from track $T_7$ most delayed, the systems also compensate skew for any other time relation of the signals. For example when the signal from track 7 is most advanced and that from track 1 is most delayed, the track numbers $n$, $p$ shown in FIGS. 1 and 5 need only be changed to $(7-n$ and $(7-p)$ respectively, in order to permit substantially retaining the foregoing explanations.

Only the one set in a system according to FIG. 1 or FIG. 5 that satisfies the condition $E_n>E_p$ operates to generate the reading clock signal, while the other set, namely the one which satisfies the condition $E_n<E_p$, does not generate the clock signal since there is no output of the differential amplifier DA1 in the track discriminating voltage generator unit TG.

As explained above, the skew compensating unit C functions to detect the skew quantity from the input signal of the signal detection unit D, according to which the unit C automatically adjusts the time delay of the reading clock signal (C). This operation can be divided into the following three stages:

(1) Detection of the track having the most time-advanced reading input signal of the same digit.

(2) Conversion of the reading input signal into a digital or analog quantity unique to each track.

For instance, the input signal may be converted into an analog quantity by assigning a unique amplitude to each track, so that the respective amplitudes increase or decrease in an arithmetical progression in accordance with the track number sequence from the edge of the tape, or so that the amplitude difference between the adjoining tracks is constant. For instance, an output of 1 v. is provided for the first track, 2 v. for the second track and so on, with a 1 v. difference between each adjoining track, thus finally reaching an output voltage of 7 v. for the 7th track.

(3) After in stage (1) the most advanced track (the Pth track) is detected and simultaneously in stage 2 a quantity unique to the corresponding track number is generated, the time delay between the advanced and subsequent signals is detected in the third stage and is compared with the track separation between two signals derived from either the quantity unique to the above-mentioned track number, thus detecting the time delay between adjoining tracks as indicative of the skew quantity. Based on this result, the timing of the clock signal generation is controlled.

For instance, if the proper track voltage has been selected in an arithmetical progression as exemplified above, the proper voltage amplitude $E_p$, corresponding to the most advanced track $T_p$, and simultaneously the skew detection reference voltage E*rot*, which increases in linear proportion to time, are generated. This is done by extracting samples of the signal of each track, and comparing the sample voltages with the voltage difference $(E_n-E_p)$ between the voltage $E_n$ converted to the proper amplitude, and the voltage $E_p$ for the most advanced track. The clock signal (C) is generated at the time point at which the track signal is delayed by a time proportional to the difference ratio $Erotn/(E_n-E_p)$; and this timed clock signal is used for resetting the flip-flops of the reading signal detection unit D ($tn$ denotes the time difference between the most advanced signal and the signal of track $n$).

FIGS. 2, 3*a* and 3*b* show the pulse waves at each stage of these operations. Diagrams A1 to A7 indicate two digits of reading signal pulses from tracks $T_1$ to $T_7$. Shown at AC is the time position of the reading clock signal pulse generated by the skew compensating unit C. Diagrams B1 to B7 indicate the respective wave shapes into which the signal pulses A1 to A7 are converted and whose amplitudes are unique to the respective tracks. Shown at C' in FIG. 3*b* is the amplitude voltage $E_p$ generated by the most advanced signal of each digit, and at D' the wave of the skew detection reference voltage E*rotn*. Diagram E shows a comparison between the difference $(E_n-E_p)$ of the track amplitude signals $E_n$ and $E_p$, and the voltage E*rotn* which has been sampled by the signal of each track.

We can set: $E_n-E_p=(n-p)lo$, wherein $lo$ is the proper amplitude difference value between the adjoining tracks, namely $lo=E_n-E_{n-1}$. If "$to$" is the time difference between the adjoining tracks, then:

$$\frac{Erotn}{E_n-E_p}=\frac{Eroto\ (n-p)}{lo(n-p)}=\frac{Ero}{lo}\cdot to$$

Since E*ro*, $lo$ are constants set in advance, the value of $Erotn/(E_n-E_p)$ is proportional to the time delay between adjoining tracks, and the skew quantity "$to$" is accordingly:

$$to=\frac{tnlo}{E_n-E_p}$$

Therefore, when the clock signal is generated from the signal of each track at the cycle time point "$(N-n)to$" (wherein N is the total number of tracks), the clock signal occurs at the same time as the signal of the track most delayed by skew. Hence there occurs no overlapping with the signal of the subsequent digit, thus permitting perfect reading until the amount of dynamic skew almost reaches the length of the signal cycle T.

As mentioned, the components shown by block symbols only, are generally known. Thus, with respect to the various bistable and monostable multivibrators, differentiating circuits, differential and buffer amplifiers, reference may be had to such textbooks as Computer Basics, vol. 4 and vol. 6, published by Howard W. Sams & Co., Inc,, New York; Millman and Taub, Pulse and Digital Circuits, McGraw-Hill Book Co., New York; and Microcircuit Handbook, published by the Fairchild Semiconductor Corp. of Mountain View, Calif.

To those skilled in the art it will be obvious from a study of this disclosure that my invention permits of a great variety of modifications and may be given embodiments other than particularly illustrated and described herein, without departing from the essential features of my invention and within the scope of the claims annexed hereto.

I claim:

1. A system for compensating time delay or skew between equidigitally correlated multitrack signals, comprising input terminals for receiving the respective input signals, respective output pulse generating means connected to said input terminals and each having a pulse release control lead; delay-responsive means connected to said input terminals for detecting the time delay between said input signals, said delay-responsive means comprising conversion means connected to said respective input terminals for converting said input signals to respectively different quantities identifying the respective tracks; comparator means connected to said conversion means for detecting the track separation between the most advanced input signal and a subsequent signal of the same digit by comparison of said respective track-identifying quantities, said comparator means having an output signal dependent upon the result of the comparison; means for determining the time difference between said most advanced input signal and subsequent input signals; clock pulse generating means connected to said delay-responsive means for furnishing a clock pulse time-positionally controlled in accordance with said delay, said clock pulse generating means having a clock pulse output connected to said release control leads whereby delay between said input signals is compensated by time shifting of the output pulses; and logic circuit means forming from said comparison result and said time difference a control signal indicative of the amount of skew, said logic circuit means forming part of said pulse generating means for controlling the time position of said clock pulses in dependence upon said skew-indicative control signal.

2. A system for compensating time delay or skew between equidigitally correlated multitrack signals, comprising input terminals for receiving the respective input signals; respective output pulse generating means connected to said input terminals and having each a pulse release control lead, said output pulse generating means comprising for each signal track a first flip-flop having respective set and reset inputs and respective set and reset outputs, said set input being connected to one of said respective input terminals, two AND gates each having a gate output and two gate inputs, one of said gate inputs being connected to one of said respective flip-flop outputs, a second flip-flop having respective set and reset inputs connected to the two gate outputs respectively, said second flip-flop having an output furnishing the output pulses of the system; delay-responsive means connected to said input terminals for detecting the time delay between said input signals; and clock pulse generating means connected to said delay-responsive means for furnishing a clock pulse time-positionally controlled in accordance with said delay, said clock pulse generating means having a clock pulse output connected to said release control leads whereby delay between said input signals is compensated by time shifting of the output pulses, said reset input of said first flip-flop and said other two gate inputs of said two gates being connected to said clock pulse output to receive said time-shiftable clock pulses.

3. A system for compensating time delay or skew between equidigitally correlated multitrack signals, comprising input terminals for receiving the respective input signals; respective output pulse generating means connected to said input terminals and having each a pulse release control lead, delay-responsive means connected to said input terminals for detecting the time delay between said input signals, said delay-responsive means comprising for each signal track a detector flip-flop and a coincidence gate, said gate having two inputs of which one is connected to one of said respective input terminals, said detector flip-flop having a set input connected to the output of said gate and having a reset input, a lock-out flip-flop having a set input connected to the outputs of all of said detector flip-flops and having a set output connected to said other inputs of all of said coincidence gates whereby, upon setting of said lock-out flip-flop by the first arriving input signal through one of said coincidence gates, all of said other coincidence gates are blocked, resistors of respectively different resistance connected to said respective outputs of said detector flip-flops to provide for each detector flip-flop, when set, a voltage quantity identifying the track furnishing the most advanced input signal; a comparator means connected to said resistors for detecting the track separation between the most advanced input signal and a subsequent signal of the same digit by comparison of said respective track-identifying quantities, said comparator means having an output signal dependent upon the result of the comparison; means for determining the time difference between said most advanced input signal and subsequent input signals; clock pulse generating means connected to said delay-responsive means for furnishing a clock pulse time-positionally controlled in accordance with said delay, said clock pulse generating means having a clock-pulse output connected to said release control leads whereby delay between said input signals is compensated by time shifting of the output pulses, the reset input of said detector flip-flop being connected to said clock pulse output; and logic circuit means for forming from said comparison result and said time difference a control signal indicative of the amount of skew, said logic circuit means forming part of said pulse generating means for controlling the time position of said clock pulses in dependence upon said control signal.

References Cited

UNITED STATES PATENTS

| | | | |
|---|---|---|---|
| 2,991,452 | 7/1961 | Welsh | 340—172.5 |
| 2,937,366 | 5/1960 | Sims | 340—174 |
| 3,154,762 | 10/1964 | Morphet | 340—172.5 |
| Re. 25,405 | 6/1963 | Witt et al. | 340—174.1 |

PAUL J. HENON, *Primary Examiner.*

I. S. KAVRUKOV, *Assistant Examiner.*

U.S. Cl. X.R.

340—174